United States Patent
Richardson et al.

(10) Patent No.: US 6,329,944 B1
(45) Date of Patent: Dec. 11, 2001

(54) TAG COMMUNICATION PROTOCOL & SYSTEM

(75) Inventors: David L. Richardson; Scott A. Stratmoen, both of Arlington Heights, IL (US); Giora A. Bendor, Columbia, MD (US); Henry E. Lee, Ellicott City, MD (US); Martin J. Decker, Baltimore, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/569,931

(22) Filed: May 12, 2000

(51) Int. Cl.$^7$ .................................................. G01S 13/76
(52) U.S. Cl. .............................. 342/42; 342/44; 342/50; 342/51; 340/7.3; 340/10.33; 340/10.42
(58) Field of Search ................... 342/44, 51, 50; 340/7.32, 10.1, 10.3, 10.31, 10.32, 10.33, 10.34, 10.4, 10.41, 10.42

(56) References Cited

U.S. PATENT DOCUMENTS

| | | | |
|---|---|---|---|
| 4,027,840 | 6/1977 | Blair | 246/122 R |
| 4,242,663 | 12/1980 | Slobodin | 235/380 |
| 4,359,733 | 11/1982 | O'Neil | 342/36 |
| 4,364,049 | 12/1982 | Moore et al. | 342/43 |
| 4,682,173 | 7/1987 | Kotoh et al. | 342/51 |
| 5,072,900 | 12/1991 | Malon | 246/5 |
| 5,387,916 | 2/1995 | Cohn | 342/44 |
| 5,414,432 | 5/1995 | Penny, Jr. et al. | 342/357 |
| 5,453,747 | * 9/1995 | D'Hont et al. | 342/42 |
| 5,471,212 | 11/1995 | Sharpe et al. | 342/51 |
| 5,486,830 | 1/1996 | Axline, Jr. et al. | 342/42 |
| 5,521,601 | 5/1996 | Kandlur et al. | 342/44 |
| 5,525,992 | 6/1996 | Froschermeier | 342/42 |
| 5,563,589 | 10/1996 | Blaimont et al. | 340/933 |
| 5,602,538 | 2/1997 | Orthmann et al. | 340/825.54 |
| 5,606,313 | * 2/1997 | Allen et al. | 340/10.31 |
| 5,621,412 | * 4/1997 | Sharpe et al. | 340/10.33 |
| 5,627,517 | 5/1997 | Theimer et al. | 340/572 |
| 5,629,691 | 5/1997 | Jain | 340/961 |
| 5,640,151 | 6/1997 | Reis et al. | 340/825.54 |
| 5,699,066 | 12/1997 | Marsh et al. | 342/44 |
| 5,701,127 | * 12/1997 | Sharpe | 340/10.2 |
| 5,787,174 | 7/1998 | Tuttle | 380/23 |
| 5,856,788 | 1/1999 | Walter et al. | 340/825.54 |
| 5,887,176 | * 3/1999 | Griffith et al. | 713/320 |
| 5,895,436 | 4/1999 | Savoie et al. | 701/214 |
| 6,064,320 | * 5/2000 | d'Hont et al. | 340/933 |
| 6,265,963 | * 7/2001 | Wood, Jr. | 340/10.4 |

* cited by examiner

Primary Examiner—John B. Sotomayor
(74) Attorney, Agent, or Firm—Terry J. Anderson; Karl J. Hoch, Jr.

(57) ABSTRACT

A method of communicating to a RF tag having a low power mode and a scan mode with a radar and an interrogator. The method comprises the steps of alternating the RF tag between the low power mode and the scan mode and then transmitting a wake-up call to the RF tag with the radar. Next, the wake-up call is received from the radar by the RF tag when the RF tag is in the scan mode. Once the wake-up call has been received, the radar will transmit a downlink message to the RF tag. Upon receipt of the downlink message, the RF tag will send an uplinked message to the radar. After the uplink message has been sent to the radar, the RF tag will return to the low power mode. By alternating the RF tag between the low power mode and the scan mode, the power consumption of the RF tag is greatly reduced thereby increasing the battery life thereof.

21 Claims, 5 Drawing Sheets

TAG COMMUNICATION PROTOCOL & SYSTEM

STATEMENT OF GOVERNMENT RIGHTS

This invention was made with Government support under contract F30602-98-0257 awarded by the United States Air Force. The Government has certain rights in this invention.

CROSS-REFERENCE TO RELATED APPLICATIONS (Not Applicable)

BACKGROUND OF THE INVENTION

The present invention generally relates to radio frequency communications and more particularly to a radio frequency communication protocol between an interrogator and a tag.

Radio frequency (RF) tags are used for tracking of ground-based inventory by an overhead vehicle such as an aircraft or satellite. Upon interrogation by the radar of the aircraft or satellite, the radar responsive tag will transmit. a unique identifier. The unique identifier provides information about the tag. As such, RF tags are used to control inventory of assets on land and sea.

Typically, the RF tags are interrogated at unscheduled times. Accordingly, the RF tag must be turned on continuously to listen for the interrogator's signal. However, the tag's power consumption limits the tag's battery life to only a few hours when continuously listening for the interrogator. This deficiency is amplified by the fact that interrogation times are irregular and scheduling is impractical and/or impossible. The prior art RF tags typically remain in a state of readiness for interrogation thereby leading to a substantial amount of power consumption.

Prior art RF tags that allow unscheduled communications with an interrogator have limited signal processing and can only operate at short ranges. However, the limited signal processing ability of these prior art RF tags limits the tags to the processing of very strong signals. Weak and noisy signals are not useable with the prior art RF tag. This results in a limited operating range from as little as 1 meter to at most 100 meters for the prior art RF tag.

The present invention addresses the above-mentioned deficiencies in the prior art RF tags by providing a RF tag communications protocol between an interrogator and the RF tag. The communications protocol of the present invention provides a method whereby power consumption within the RF tag is adjusted thereby providing a power savings within the RF tag and extending the battery lifetime thereof. Additionally, the RF communications protocol of the present invention provides a method whereby the RF tag will respond only to an interrogator that is within a prescribed range. The RF communications protocol of the present invention provides a method of communication between an RF tag and an interrogator that is power efficient.

BRIEF SUMMARY OF THE INVENTION

A method of communicating to a RF tag having a low power mode and a scan mode with a radar and an interrogator. The method comprises the steps of alternating the RF tag between the low power mode and the scan mode and then transmitting a wake-up call to the RF tag with the radar. Next, the wake-up call is received from the radar by the RF tag when the RF tag is in the scan mode. Once the wake-up call has been received, the radar will transmit a downlink message to the RF tag. Upon receipt of the downlink message, the RF tag will send an uplink message to the radar. After the uplink message has been sent to the radar, the RF tag will return to the low power mode. By alternating the RF tag between the low power mode and the scan mode, the power consumption of the RF tag is greatly reduced thereby increasing the battery life thereof.

Typically, the RF tag is alternated between the low powered mode for 977 milliseconds and the scan mode for 23 milliseconds. The uplink message will not be sent to the radar until a prescribed period of time has passed. Typically, the prescribed period of time is specified in the downlink message received by the RF tag. Similarly, the RF tag will be returned to the low power mode after a prescribed period of time in order to conserve power. Typically, the prescribed period of time is about four hours.

In the preferred embodiment, a wake-up call is modulated with a linear frequency modulation. The radar will transmit the wake-up call in a left beam, a center beam, and a right beam. The pulse width of the left beam is 20 $\mu$s, the pulse width of the center beam is 30 $\mu$s, and the pulse width of the right beam is 40 $\mu$s. In the preferred embodiment, the downlink message and the uplink message are transmitted when the radar transmits a wake-up call in the center beam. In this respect, the RF tag will receive and transmit information to the radar when the beam from the radar is aligned with the RF tag.

BRIEF DESCRIPTION OF THE DRAWINGS

These as well as other features of the present invention will become more apparent upon reference to the drawings wherein.

DETAILED DESCRIPTION OF THE INVENTION

Figure 1:
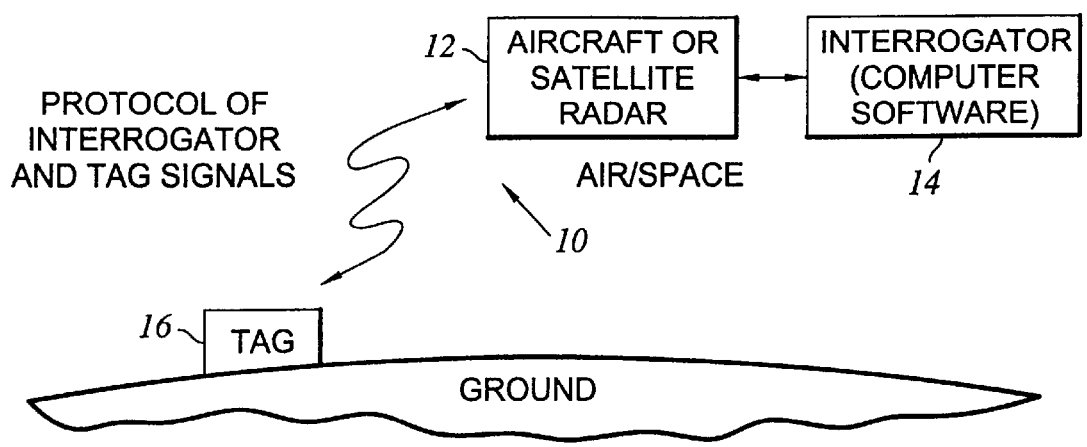
FIG. 1 illustrates a radar responsive tag system utilizing a tag communications protocol of the present invention.

Referring now to the drawings wherein the showings are for purposes of illustrating a preferred embodiment of the present invention only and not for purposes of limiting the same, FIG. 1 illustrates a radar responsive tag system 10 utilizing a tag communications protocol of the present invention. The radar responsive tag system 10 comprises a radar 12 disposed on an aircraft or satellite. The radar 12 is in electrical communication with an interrogator 14 configured as computer software for the radar 12 of the aircraft or satellite. The radar 12 of the aircraft or satellite communicates via radio frequencies to a tag 16 that is disposed on the object to be identified. In this respect, the tag 16 can receive and transmit radio frequency (RF) signals to the radar 12 of the aircraft or satellite. The radar 12 can interrogate the tag 16 such that the tag 16 will transmit a unique identifier to the radar 12 that identifies the object. In the preferred embodiment, the radar responsive tag system 10 utilizing the communication protocol of the present invention can communicate with a medium range satellite that has a slant range in excess of one-hundred miles. Accordingly, the radar 12 can track ground based inventory by interrogating the tag 16 disposed on ground or sea assets.

Figure 2:
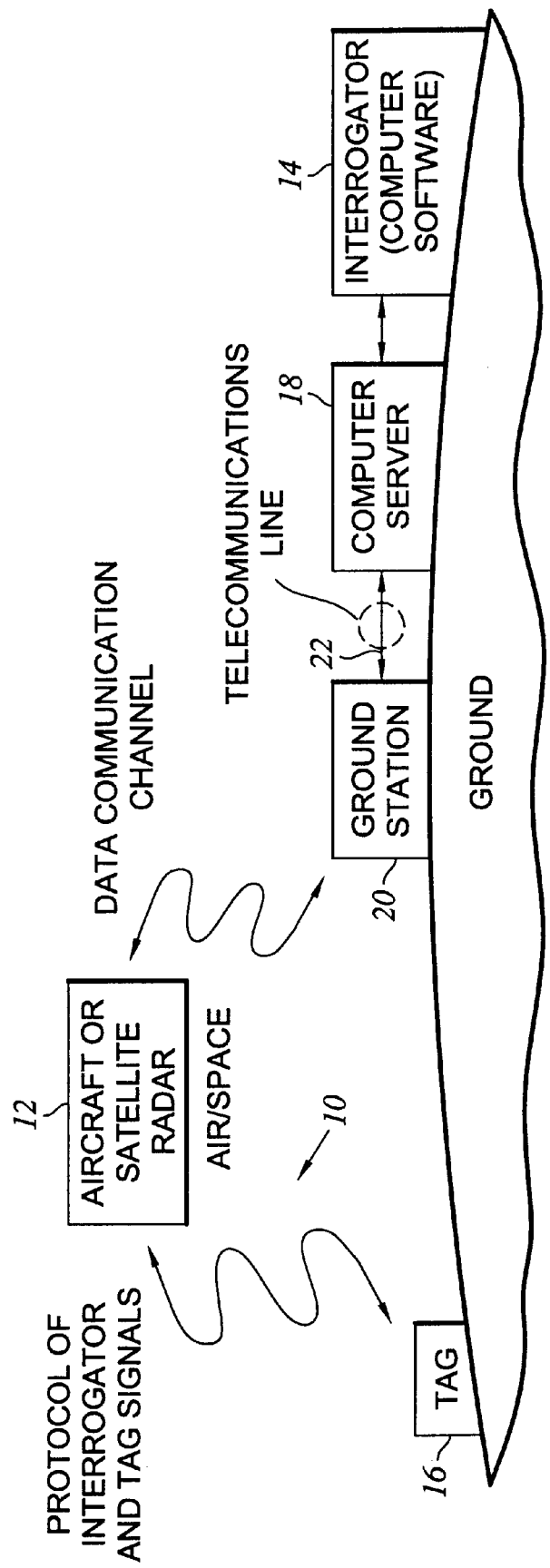
FIG. 2 illustrates an alternative configuration of the radar responsive tag system shown in FIG. 1.

Referring to FIG. 2, an alternative configuration of the radar responsive tag system 10 is shown. In the alternative configuration, the interrogator 14 is not an integral part of the radar 12 of the aircraft or satellite. In this respect, the interrogator 14 communicates with the radar 12 using a computer server 18 and a ground station 20. The ground station 20 transmits the signals from the interrogator 14 via a data communication channel to the radar 12 of the satellite or aircraft. The interrogator 14 is connected to the ground station 20 via the computer server 18 and a telecommunication line 22. Therefore, in the alternative configuration of the radar responsive tag system 10, changes to the interrogator 14 (i.e., software) may be easily implemented because the interrogator 14 is located on the ground.

Figure 4:
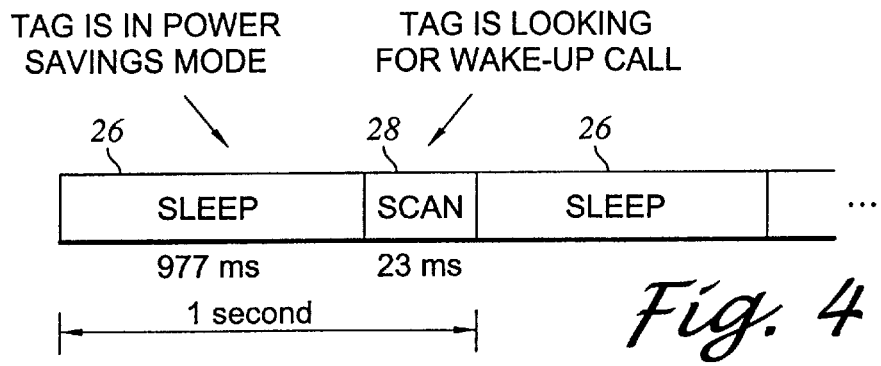
FIG. 4 is a time line for the scanning of the RF tag of the present invention.
Figure 3:
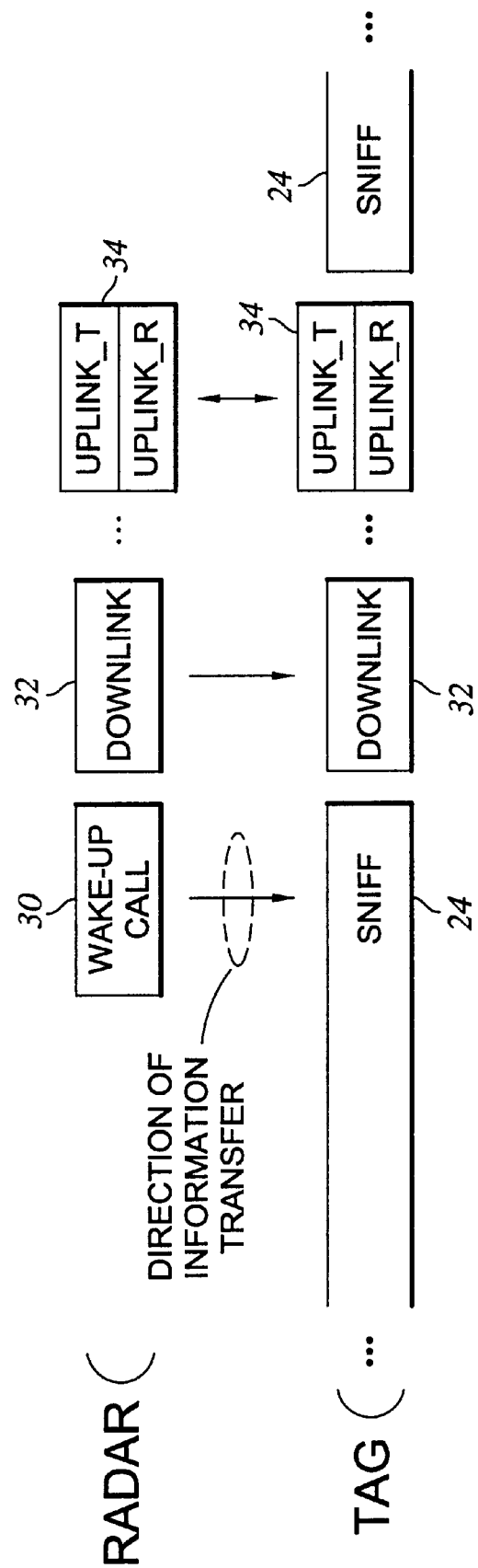
FIG. 3 is a system time line for the RF tag and radar shown in FIGS. 1 and 2.

The fundamentals of the tag communications protocol for the radar responsive tag system 10 are shown in FIG. 3. The tag 16 begins in a sniff mode 24 consisting of a low power sleep stage 26 and a scan stage 28, as seen in FIG. 4. In the sleep stage 26, the tag 16 is in a power saving mode. Typically, the sleep stage 26 lasts for about 977 ms and the tag 16 consumes about 10 micro amps of current at 3 volts. The scan stage 28, on the other hand, typically lasts about 23 ms such that the tag 16 consumes about 1 Watt of power. The sleep stage 26 and the scan stage 28 alternate during the sniff mode 24 until a valid wake-up call 30 is received during the scan stage 28 of the sniff mode 24, as will be explained below. Accordingly, if the tag 16 does not receive a wake-up call 30 during the scan stage 28, the tag 16 will return to the sleep stage 26.

Figure 5:
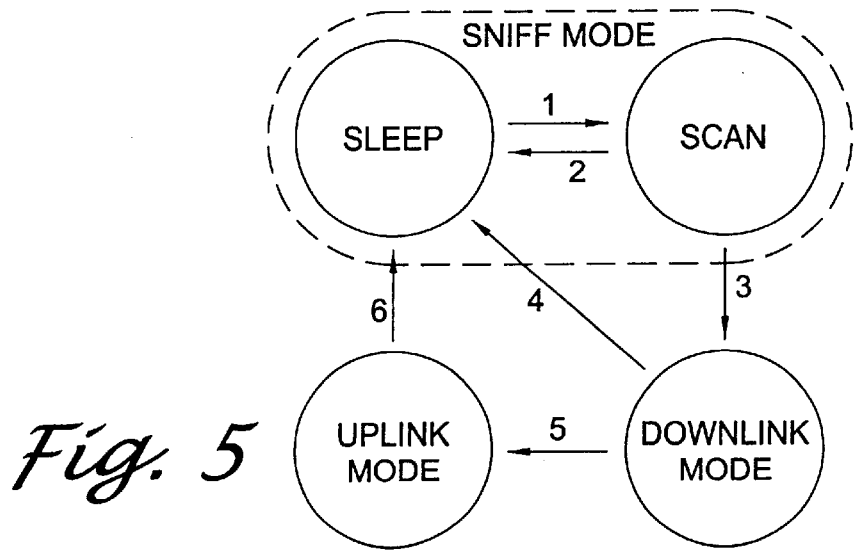
FIG. 5 is a RF tag state diagram for the present invention.

Referring to FIG. 5, once the tag 16 receives a valid wake-up call 30, the tag 16 goes into a downlink mode and waits for a downlink message 32. Typically, the radar 12 is programmable such that it will perform a wake-up call 30 and then send a downlink message 32 a prescribed number of times (e.g., three times). After the radar 12 has completed sending the wake-up call 30 and downlink message 32, the radar 12 will wait a programmable amount of time (e.g., typically four hours) before transmitting a new wake-up call 30.

Once the tag 16 receives a valid downlink message 32, the tag 16 will wait a specified amount of time before transmitting an uplink message 34 to the radar 12. This delay allows the tag 16 to skip over redundant wake-up calls 30 and multiple downlink messages 32 that are repeated in the message group. The time interval between receiving a downlink message 32 and transmission of an uplink message 34 may be specified in the downlink message 32 received by the tag 16.

Once the tag 16 finishes sending an uplink message 34, the tag 16 sets a programmable lock out timer that enables the tag 16 to ignore any new wake-up calls 30 and downlink messages 32. The lock out timer is nominally set to four hours and prevents the batteries in the tag 16 from depleting as a result of multiple interrogations or false signals. Accordingly, this feature restricts the tag 16 from sending any new uplink messages 34 before a prescribed minimum time period has passed (i.e., about four hours).

At any point the tag 16 determines that the signal from the radar 12 is invalid, the tag 16 will enter the sleep stage 26. This improves the power savings in the tag 16 when the signals from the radar 12 may be false or erroneous. The period of the sleep stage 26 may be programmable such that the tag 16 will be in the power savings mode for a prescribed period of time.

Referring to FIG. 5, the tag 16 transitions between multiple states. Accordingly, the tag 16 transitions between each major state as shown in FIG. 5 and described by the following table:

TABLE 1

Definitions of Tag State Transitions.

| Transition No. | |
| --- | --- |
| 1 | Sleep timer expires, begin scan for interrogator. |
| 2 | Interrogator not found, return to sleep. |
| 3 | Detects interrogator, look for downlink. |
| 4 | Downlink fails, return to sleep. |
| 5 | Successful downlink; prepare for uplink. |
| 6 | Uplink complete, return to sleep. |

Figure 6:
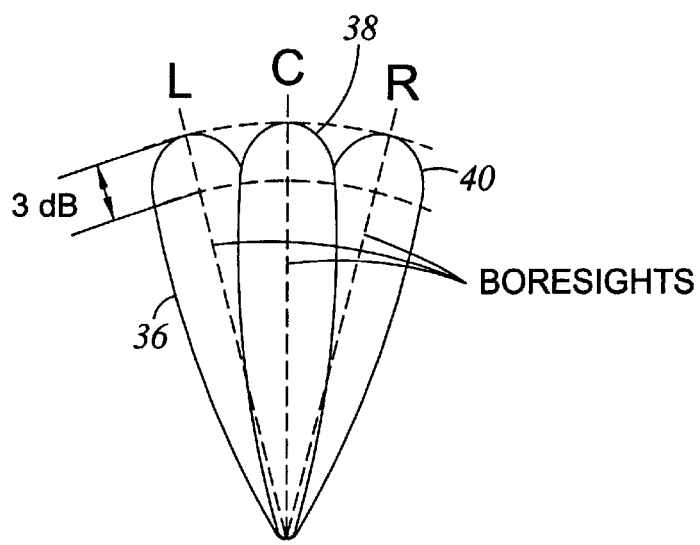
FIG. 6 is a diagram depicting the signal for the radar used with the present invention.

In order to ensure that the tag 16 is receiving a signal from the main beam of the radar 12 and not a leakage signal from the side lobes of the radar 12, the communications protocol of the present invention provides a method of informing the tag 16 whether or not it is receiving the main beam of the radar 12. Referring to FIG. 6, the radar 12 will steer its antenna (i.e., transmission source) during the wake-up call 30 to a left position 36, a center position 38, and a right position 40. Each of the positions 36, 38, 40 overlap the beam from the radar 12 at the −3 db power point. As will be explained below, the radar 12 expects to communicate with the tag 16 while the radar antenna and hence the beam from the radar 12 is in the center position 38. Accordingly, the radar 12 will only transmit a downlink message 32 and the tag 16 will only transmit an uplink message 34 while the beam is in the center position 38.

The wake-up call 30 from the radar 12 will be of a pulse width (PW) and linear frequency modulated (LFM) according to the following table:

TABLE 2

Typical Radar Modulation in a Wake-Up Call.

| | PW, TIME | LFM, FREQUENCY DEVIATION |
| --- | --- | --- |
| "L" | 20 µs | 100 MHz |
| "C" | 30 µs | 100 MHz |
| "R" | 40 µs | 100 MHz |

In this respect, the tag 16 will contain a suitable receiver to receive and measure the PW and LFM of the wake-up call 30.

Figure 7:
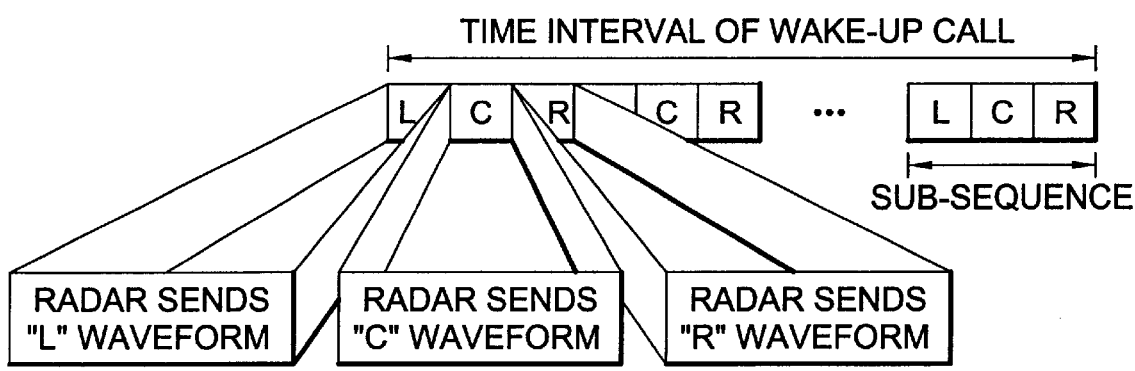
FIG. 7 is a diagram depicting a wake-up call signal for the present invention.

In the communications protocol of the present invention, the pulse width and linear frequency modulation of the wake-up call 30 is deviated in order to inform the tag 16 of the position 36, 38, or 40 of the beam from the radar 12. Accordingly, when the beam from the radar 12 is in the left position 36, the wake-up call 30 will have a pulse width of approximately 20 µs, while a wake-up call 30 from a beam of the radar 12 in the center position 38 will have a pulse width of approximately 30 µs and a wake-up call 30 from a beam of the radar 12 in the right position 40 will have a pulse width of approximately 40 μs. The linear frequency modulation (LFM) of the wake-up call 30 will be approximately 100 MHz for the left position 36, the center position 38, and the right position 40. The duration of the wake-up call 30 depends on the number of radar pulses and the pulse repetition frequency (PRF) thereof. Typically, the wake-up call 30 will contain 300 pulses with a PRF of 300 Hz thereby resulting in a wake-up call 30 that is approximately one second long. In the communications protocol of the present invention, the tag 16 will measure the signal strength, pulse width, and LFM deviation of the wake-up call 30 during the scan stage 28 of the sniff mode 24. During the time that the tag 16 receives the wake-up call 30, the tag 16 will receive approximately seven pulses from the radar 12. This will result in slightly more than two sub-sequences of the wake-up call 30 shown in FIG. 7.

The left position 36, center position 38, and right position 40 of the beam from the radar 12 generate a characteristic signal. Accordingly, the following table shows the signal strength that is received at the tag 16 for different distances between the tag 16 and the radar 12.

TABLE 3

Signal Strength at the Tag.

| Relative distance from tag to radar | Tag in left beam, L | | | Tag in center beam, C | | | Tag in right beam, R | | |
|---|---|---|---|---|---|---|---|---|---|
| | L | C | R | L | C | R | L | C | R |
| Far | x | — | — | — | x | — | — | — | x |
| Medium | X | x | — | x | X | x | — | x | X |
| Close | X | X | x | X | X | X | x | X | X |

X = Strong Signal
x = Weak Signal
— = No Signal

The tag 16 measures the relative strength of the signal from the radar 12 to determine the relative distance from the tag 16 to the radar 12. Accordingly, the tag 16 can determine if the signal from the radar 12 has enough strength to be a valid signal.

Once the tag 16, during the scan stage 28, identifies a pulse sequence of sufficient strength according to Table 3, the tag 16 will next identify the corresponding PW and LFM according to Table 2. By determining the PW and LFM for the wake-up call 30, the tag 16 determines whether the beam from the radar 12 is in the left position 36, center position 38, or right position 40. Therefore, if the tag 16 determines that the wake-up call 30 has sufficient strength according to Table 3 and is from the center position 38 according to Table 2, then the tag 16 has received a valid wake-up call 30.

After determining that the wake-up call 30 is valid, the tag 16 will start a programmable downlink wait timer that is set to the same duration as the wake-up call 30 (i.e., typically one second). If the programmable downlink wait timer of the tag 16 expires before a downlink message 32 is received thereby, then the tag 16 will resume the sniff mode 24, as previously described. Otherwise, the tag 16 will read the downlink message 32 and transmit an uplink message 34, as seen in transmission state number 5 of FIG. 5. After transmitting the uplink message 34, the tag will return to the low power sniff mode 24 as previously described.

As previously mentioned, the tag communications protocol of the present invention provides a power savings for the tag 16. Typically, the tag 16 operates using standard 3 volt lithium batteries. When the tag 16 is in the sleep stage 26 it typically draws 10 micro amperes of current at three volts. During the scan stage 28, the tag 16 nominally dissipates approximately one watt of power for a scan duration of 23 milliseconds occurring every second. The duration of the downlink message 32 is typically 1.1 seconds and occurs every four hours such that the power dissipated during the downlink message 32 is nominally two watts. Furthermore, the duration of the uplink message 34 is nominally ten seconds and occurs every four hours such that five watts is dissipated.

Therefore, energy utilization for the tag 16 is power x time. The average energy ($E_T$) used by the tag 16 is:

$$E_T = E_{SLEEP} + E_{SCAN} + E_{DOWNLINK} + E_{UPLINK} \quad (1)$$

The energy for each of the states ($E_{SLEEP}$, $E_{SCAN}$, $E_{DOWNLINK}$, and $E_{UPLINK}$) is typically stated in units of Watt-hours and is shown below in Equations 2 to 6. The usage factor in Equations 2 to 6 typically has a range of between about 0 to 1 and indicates how much time the tag 16 spends in that corresponding mode. Typically, the usage factor is weighted for a four hour interval (i.e., the time between wake-up calls 30). The time duration of the uplink and downlink are nominally 1 second and 2 seconds, respectively.

$$E_{SLEEP} = 3V \times 10 \, \mu A \times 977/1000 \text{ usage factor} \times 1 \text{ hr} = 29.3 \text{ microWatt-hr} \quad (2)$$

$$E_{SCAN} = 1 \text{ Watt} \times 23/1000 \text{ usage factor} \times 1 \text{ hr} = 23 \text{ milliWatt-hr} \quad (3)$$

$$E_{UPLINK} = 5 \text{ Watts} \times (0.25 \times 1/3600 \text{ usage factor}) \times 1 \text{ hr} = 347 \text{ microWatt-hr} \quad (4)$$

$$E_{DOWNLINK} = 2 \text{ Watts} \times (0.25 \times 2/3600 \text{ usage factor}) \times 1 \text{ hr} = 278 \text{ microWatt-hr} \quad (5)$$

$$E_T = \text{sum of above} = 23.7 \text{ milliWatt-hr} \quad (6)$$

The battery life (L) for the tag 16 using the communications protocol of the present invention, is given by the following equation:

$$L = E_{AVAIL-BATT}/E_T = 3 \text{ batteries} \times (3 \text{ V} \times 1 \text{ Amp-hr})/E_T = 380 \text{ hours, or } 15.8 \text{ days} \quad (7)$$

Figure 8:
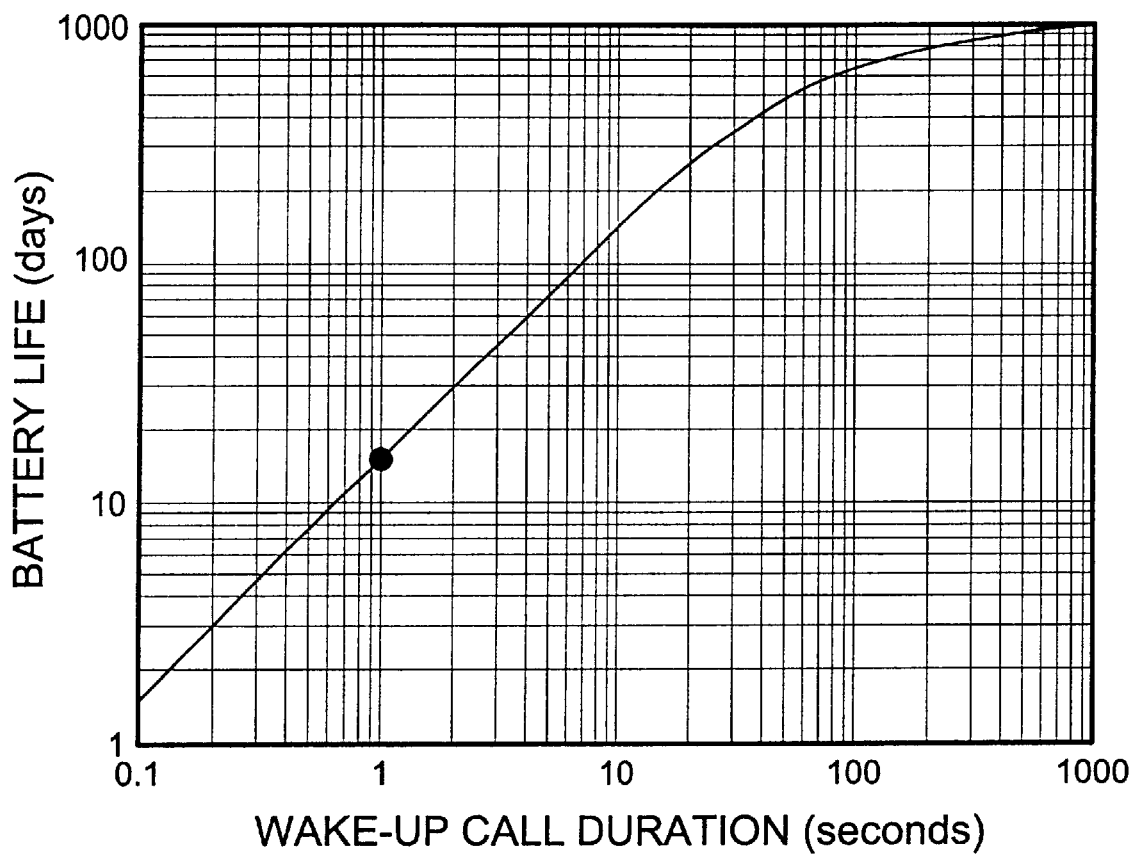
FIG. 8 is a graph depicting the battery life of the RF tag for the communications protocol of the present invention.

Accordingly, using three batteries for the tag 16, the battery life will be approximately 380 hours or 15.8 days. Referring to FIG. 8, it is concluded that a typical one second wake-up call 30 will correspond to a battery life of 16 days, as previously mentioned. Therefore the main factor in the life of the battery is the periodicity of the scan stage 28. The communications protocol of the present invention provides longer battery life in the tag 16 because the tag 16 spends a majority of time in the low power sleep stage 26. As seen by Equations 2 to 7, the main factor in the power consumption of the tag 16 is the frequency of the scan stage 28, which as previously mentioned, is set by the sleep timer. Therefore, by changing the duration of future wake-up calls 30 and by sending a new value to the sleep timer via the downlink message 32, the power savings of the tag 16 can be adjusted accordingly. Therefore, in the process of modifying the duration of the wake-up call 30, the interrogator 14 of the radar 12 can change the power consumption in the tag 16. The change in the power consumption of the tag 16 will follow the curve shown in FIG. 8.

Additional modifications and improvements of the present invention may also be apparent to those of ordinary skill in the art. Thus, the particular combination of parts described and illustrated herein is intended to represent only a certain embodiment of the present invention, and is not intended to serve as limitations of alternative devices within the spirit and scope of the invention.

What is claimed is:

1. A method of establishing communication between a radar and an RF tag having a sleep stage and a scan stage, the method comprising the steps of:
   a) alternating the RF tag between the sleep stage and the scan stage;
   b) transmitting a wake-up call to the RF tag via the radar;
   c) receiving the wake-up call from the radar when the RF tag is in the scan stage;
   d) transmitting a downlink message to the RF tag via the radar;
   e) sending an uplink message to the radar via the RF tag upon receipt of the downlink message; and
   f) returning the RF tag to the sleep stage.

2. The method of claim 1 wherein step (a) comprises alternating the RF tag between the sleep stage for 977 ms and the scan stage for 23 ms.

3. The method of claim 1 wherein step (e) comprises sending an uplink message to the radar after a prescribed period of time.

4. The method of claim 3 wherein the prescribed period of time is specified in the downlink message.

5. The method of claim 1 wherein step (f) comprises returning to the sleep stage for a prescribed period of time in order to conserve power.

6. The method of claim 5 wherein the prescribed period of time is about four hours.

7. The method of claim 1 wherein step (b) comprises modulating the wake-up call with a pulse width and a linear frequency modulation prior to transmission thereof.

8. The method of claim 7 wherein step (b) comprises transmitting the wake-up call in a left beam, a center beam, and a right beam of the radar.

9. The method of claim 8 wherein the downlink message and the uplink message are transmitted when the radar is transmitting in the center beam.

10. The method of claim 9 wherein the left beam of the radar has a first prescribed pulse width, the center beam has a second prescribed pulse width, and the right beam has a third prescribed pulse width.

11. The method of claim 10 wherein the pulse width of the left beam is approximately 20 $\mu$s, the pulse width of the center beam is approximately 30 $\mu$s, and the pulse width of the right beam is approximately 40 $\mu$s.

12. A radio frequency tag communications system comprising:
   a radar configured to transmit a wake-up call and a downlink message, and to receive an uplink message; and
   a tag having a scan stage and a low power sleep stage, the tag being configured to alternate between the sleep stage and the scan stage and to receive the downlink message and transmit the uplink message after the scan stage.

13. The system of claim 12 wherein the scan stage is 23 ms and the sleep stage is 977 ms.

14. The system of claim 12 wherein the tag is configured to transmit the uplink message when the tag has received the downlink message.

15. The system of claim 12 wherein the tag is configured to transmit an uplink message to the radar after a prescribed period of time from the receipt of the downlink message.

16. The system of claim 15 wherein the prescribed period of time is specified in the downlink message.

17. The system of claim 12 wherein the tag returns to the sleep stage for a prescribed period of time after transmitting the uplink message.

18. The system of claim 17 wherein the prescribed period of time is about four hours.

19. The system of claim 12 wherein the radar is configured to transmit the wake-up call in a left beam, a center beam, and a right beam.

20. The system of claim 19 wherein the radar is configured to modulate the pulse width of the wake-up call.

21. The system of claim 20 wherein the pulse width of the left beam is approximately 20 $\mu$s, the pulse width of the center beam is approximately 30 $\mu$s and the pulse width of the right beam is approximately 40 $\mu$s.

* * * * *